United States Patent Office 3,793,309
Patented Feb. 19, 1974

3,793,309
PHENYL-ACRYLIC ACID-N - [4' - (PARASUBSTITUTED PHENOLAZO)-PHENYL]-AMIDE COMPOUNDS
Edgar Siegel, Leverkusen, Germany, assignor to Bayer Aktiengesellschaft, Leverkusen, Germany
No Drawing. Filed Nov. 2, 1971, Ser. No. 194,924
Claims priority, application Germany, Nov. 2, 1970, P 20 53 711.5
Int. Cl. C07c 107/06; C09b 43/12
U.S. Cl. 260—207
7 Claims

ABSTRACT OF THE DISCLOSURE

Monoazo dyestuffs are disclosed which are free from sulphonic acid groups and correspond to the general formula

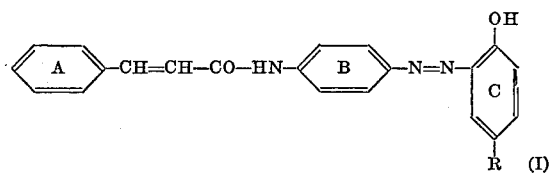

in which

R represents an alkyl or aryl radical and the benzene nuclei A, B and C may carry further non-ionic substituents, as well as their production and use for the dyeing and printing of hydrophobic fibre materials, for example, those consisting of synthetic superpolyamides, cellulose esters and aromatic polyesters, more particularly, those of polyethylene glycol terephthalate. The dyeings obtained on synthetic polyester and polyamide fibres are particularly valuable and are characterized by good general fastness properties.

---

The subject-matter of the present invention comprises monoazo dyestuffs which are free from sulphonic acid groups and correspond to the general formula

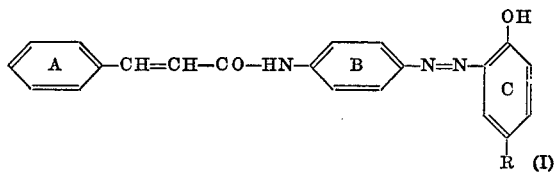

in which

R represents an alkyl or aryl radical and the benzene nuclei A, B and C may carry further non-ionic substituents, as well as their production and use.

Suitable alkyl radicals R are those with 1–4 carbon atoms, such as methyl, ethyl, n- and iso-propyl, as well as n-, iso- and tert.-butyl radicals. They may be substituted, for example, by hydroxyl, methoxy or ethoxy groups.

Suitable aryl radicals R are preferably phenyl radicals which may be substituted by chlorine, bromine, or by alkyl or alkoxy radicals with 1–4 carbon atoms.

Suitable non-ionic substituents in the nuclei A, B and C are substituents conventionally used in dyestuff chemistry, such as fluorine, chlorine, bromine, nitro, cyano, carbamoyl, alkyl, alkoxycarbonyl, alkoxy, hydroxyalkoxy, alkylsulphonyl, alkylcarbonylamino, the terms alkyl and alkoxy referring to radicals with 1–4 carbon atoms.

Preferred dyestuffs are those of the formula

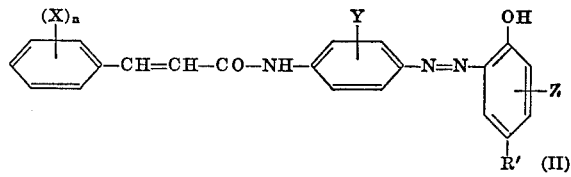

in which

R' means a $C_1$–$C_4$-alkyl radical which may be substituted by hydroxyl or methoxy groups, or means an unsubstituted phenyl radical;
X stands for chlorine, bromine, nitro, cyano, methyl, methoxy, methylsulphonyl, acetylamino or methoxycarbonyl;
Y and Z mean chlorine, methyl, methoxy or nitro; and
n represents a number from 0 to 2.

The new dyestuffs (I) can be prepared according to various processes.

One process consists in that β-phenyl-acrylic acid halides of the formula

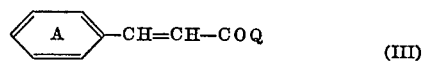

in which A has the same meaning as above and Q stands for chlorine or bromine, are reacted with aminoazo dyestuffs of the formula

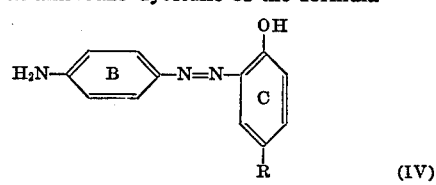

in which A, B, and C have the same meaning as above, in inert solvents.

For carrying out this reaction, the reaction partners (III) and (IV) are generally used in a molar ratio of 1:1, but a slight excess of one of the starting components does not normally affect the desired course of the reaction.

The reaction temperatures may be varied within a fairly wide range. In general, the process is carried out at 40 to 180° C., preferably at 60 to 120° C.

Suitable inert solvents are benzene, toluene, xylene, tetralin, chlorobenzene, o-dichlorobenzene, nitrobenzene, and others.

Suitable phenyl-acrylic acid halides (III) are:

β-phenyl-acrylic acid chloride, β-(2-chlorophenyl)-acrylic acid chloride, β-(4-fluorophenyl)-acrylic acid chloride, β-(2-bromophenyl)-acrylic acid chloride, β-(4-bromophenyl)-acrylic acid chloride, β-(2-nitrophenyl)-acrylic acid chloride, β-(3-nitrophenyl)-acrylic acid chloride, β-(4-nitrophenyl)-acrylic acid chloride, β-(4-cyanophenyl)-acrylic acid chloride, β-(4-methylphenyl)-acrylic acid chloride, β-(2,4-dimethylphenyl)-acrylic acid chloride, β-(4-methoxyphenyl)-acrylic acid chloride, β-(4-methylsulphonylphenyl)-acrylic acid chloride, β-(4 - methylaminocarbonylphenyl)-acrylic acid chloride, β-(4-methoxycarbonylphenyl)-acrylic acid chloride and β-phenylacrylic acid bromide.

The azo dyestuffs (IV) to be used as reaction components are known in part. They are obtained in known manner by coupling phenols (V)

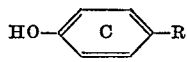

with diazotised 4-acylamino-anilines (VI) and subsequent hydrolytic elimination of the acyl group.

Suitable phenols (V) are:

4-methylphenyl, 4-ethyl-phenol, 4-n-propyl-phenol, 4-i-propylphenol, 4-n-butylphenol, 4-i-butylphenol, 4-t-butylphenol, 2,4-dimethyl-phenol, 3,4-dimethyl-phenol, 3-chloro-4-methyl-phenol, 4-(2-hydroxyethyl)-phenol, 4-hydroxydiphenyl, 4-methylsulphonyl-phenol, 4-phenyl-sulphonyl-phenol.

Suitable 4-acylamino-anilines (VI) are:

4-formylamino-aniline, 4 - acetylamino-aniline, 4-acetyl-amino-2-chloro-aniline, 4-acetylamino-2,5-dichloroaniline, 4-acetylamino-2,6-dichloro-aniline, 4-acetylamino-6-nitroaniline, 4-acetylamino-3-methylaniline, 4-acetylamino - 2 - methylaniline, 4-acetylamino-2,4-dimethylaniline, 4-acetylamino-2-methoxy-aniline.

Another process for the production of the dyestuffs (I) is characterised in that amines of the general formula

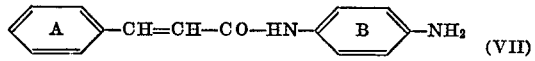

in which A and B have the same meaning as above, are diazotized and the diazo compound is coupled with phenols of the formula

in which C and R have the same meaning as above.

The amines of the Formula VII required as starting material are obtained in known manner by the acylation of 4-formylamino-anilines with β-phenyl-acrylic acid halides (III) and subsequent hydrolytic elimination of the formyl group. Suitable 4-formylamino-anilines are, for example, 4-formylamino-aniline, 4-formylamino-2-chloro-aniline, 4-formylamino-2-nitro-aniline, 4 - formyl-2-ethoxy-aniline.

The water-insoluble new dyestuffs of the general Formula I which are obtained according to the present process are suitable for the dyeing and printing of hydrophobic fibre materials, for example, those consisting of synthetic superpolyamides, cellulose esters and aromatic polyesters, more particularly, those of polyethylene glycol terephthalate. The dyeings obtained on synthetic polyester and polyamide fibres are particularly valuable and are characterised by good general fastness properties.

The parts in the following examples mean parts by weight.

EXAMPLE 1

16.7 parts β-phenyl-acrylic acid chloride are added to a solution of 22.7 parts 4-amino-2'-hydroxy-5'-methyl-1,1'-azobenzene in 200 ml. chlorobenzene, and the mixture is heated at 120° C. for 1–2 hours until the evolution of hydrogen chloride is terminated. After cooling to room temperature, the precipitated dyestuff is filtered off with suction, rinsed with benzene and dried. The dyestuffs of the formula

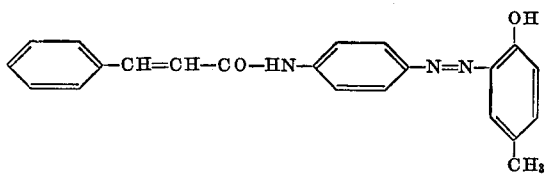

which is obtained in a good yield is ground in the usual way with a dispersing agent. An easily dispersible yellow dyestuff powder is obtained in this way.

In the following table there are described further valuable yellow disperse dyestuffs which can be prepared according to the above process, starting from the following acid chlorides (II) and aminoazo dyestuffs (III):

| | II | III |
|---|---|---|
| 2 | Cl−C₆H₄−CH=CH−COCl | H₂N−C₆H₄−N=N−C₆H₃(OH)(CH₃) |
| 3 | 2-Cl−C₆H₄−CH=CH−COCl | Same as above. |
| 4 | 2,4-Cl₂−C₆H₃−CH=CH−COCl | Do. |
| 5 | Br−C₆H₄−CH=CH−COCl | Do. |
| 6 | O₂N−C₆H₄−CH=CH−COCl | Do. |
| 7 | 3-O₂N−C₆H₄−CH=CH−COCl | Do. |
| 8 | NC−C₆H₄−CH=CH−COCl | Do. |
| 9 | H₃C−C₆H₄−CH=CH−COCl | Do. |

| | II | III |
|---|---|---|
| 10 | H₃C–C₆H₃(CH₃)–CH=CH–COCl (with CH₃ at ortho) | Do. |
| 11 | H₃C–O–C₆H₄–CH=CH–COCl | Do. |
| 12 | H₃C–SO₂–C₆H₄–CH=CH–COCl | Do. |
| 13 | H₃C–HN–CO–C₆H₄–CH=CH–COCl | Do. |
| 14 | CH₃–OOC–C₆H₄–CH=CH–COCl | Do. |
| 15 | C₆H₅–CH=CH–COCl | H₂N–C₆H₃(Cl)–N=N–C₆H₃(OH)–CH₃ (2-chloro on aminophenyl; OH ortho and CH₃ para on other ring) |
| 16 | Cl–C₆H₄–CH=CH–CO–Cl | H₂N–C₆H₃(CH₃)–N=N–C₆H₃(OH)–CH₃ |
| 17 | C₆H₅–CH=CH–CO–Cl | H₂N–C₆H₃(NO₂)–N=N–C₆H₃(OH)–CH₃ |
| 18 | 2,5-Cl₂–C₆H₃–CH=CH–CO–Cl | H₂N–C₆H₄–N=N–C₆H₃(OH)–C₂H₅ |
| 19 | H₃C–O–C₆H₄–CH=CH–CO–Cl | H₂N–C₆H₃(CH₃)–N=N–C₆H₃(OH)–C₂H₅ |
| 20 | Cl–C₆H₄–CH=CH–CO–Cl | H₂N–C₆H₄–N=N–C₆H₃(OH)–CH₂–CH₂–CH₃ |
| 21 | C₆H₅–CH=CH–COCl | H₂N–C₆H₄–N=N–C₆H₃(OH)–CH(CH₃)₂ |
| 22 | Cl–C₆H₄–CH=CH–CO–Cl | H₂N–C₆H₄–N=N–C₆H₃(OH)–CH₂–CH₂–CH₂–CH₃ |

3,793,309

TABLE—Continued

| | II | III |
|---|---|---|
| 23 | H₃C—⟨phenyl⟩—CH=CH—CO—Cl | H₂N—⟨phenyl⟩—N=N—⟨phenyl with OH⟩—CH(CH₃)—CH₂—CH₃ |
| 24 | ⟨phenyl⟩—CH=CH—CO—Cl | H₂N—⟨phenyl⟩—N=N—⟨phenyl with OH⟩—C(CH₃)₂—CH₃ |
| 25 | ⟨phenyl⟩—CH=CH—CO—Cl | H₂N—⟨phenyl⟩—N=N—⟨phenyl with OH⟩—⟨phenyl⟩ |
| 26 | 2,4-dichlorophenyl—CH=CH—COCl | H₂N—⟨phenyl⟩—N=N—⟨phenyl with OH⟩—CH₂—CH₂—OH |
| 27 | ⟨phenyl⟩—CH=CH—COCl | H₂N—⟨phenyl⟩—N=N—⟨phenyl with OH, CH₃⟩—CH₃ |
| 28 | ⟨phenyl⟩—CH=CH—COCl | H₂N—⟨phenyl⟩—N=N—⟨phenyl with OH, CH₃⟩—CH₃ |
| 29 | ⟨phenyl⟩—CH=CH—COCl | H₂N—⟨phenyl⟩—N=N—⟨phenyl with OH, Cl⟩—CH₃ |

EXAMPLE 2

27.3 parts β-(4-chlorophenyl)-acrylic acid-N-(4'-aminophenyl)-amide (prepared from 4-chloro-β-phenyl-acrylic and the solution is diazotized with 7 - parts sodium nitrite diamine and subsequent hydrolysis of the formylamino group) are dissolved in 200 parts of 5% hydrochloric acid and the solution is diazotised with 7 parts sodium nitrite at 0–5° C. The resultant diazonium salt solution is filtered and poured with good stirring at 5° C. into a solution of 10.8 parts 4-methylphenol, 28 parts sodium carbonate, 10 parts sodium hydroxide and 300 parts of water.

When the coupling is completed, the precipitated yellow dyestuff of the formula

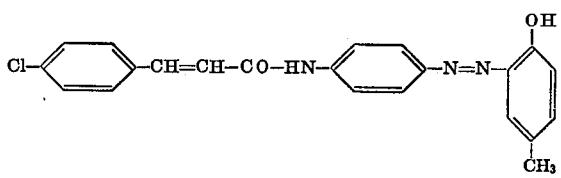

is filtered off and, for purification, recrystallized from o-dichlorobenzene. This dyestuff yields yellow dyeings of very good fastness to light, wet processing and sublimation on polyamide and polyester.

Dyeing process for polyester fibres

A dispersed dyestuff prepared according to the above Examples and pasted in 10–15 times its amount of water at 40–45° C. is added at the same temperature to a dyebath which has been adjusted with acetic acid to a pH value of 4.5–5 and contains, per litre, 2 g. of an anionic condensation product of aromatic sulphonic acids, 5 g. of a self-emulsifying carboxylic acid ester acting as carrier, and 1 g. monosodium dihydrogen phosphate. The precleaned polyester material is introduced into this dyebath (liquor ratio 1:40–1:30), the temperature is raised to 80–85° C. in the course of 15–20 minutes and this range of temperature is maintained for a further 20 minutes. The bath is then gradually brought to the boil. After a boiling time of 1–1½ hours, the dyeing process is completed. The material is then rinsed once hot and then cold. Clear yellow dyeings of very good fastness to light, sublimation and wet processing are obtained.

Dyeing process for polyamide fibres

A bath (liquor ratio 1:40–1:30) which has been heated to 40° C. is provided with the following additives: 1–2 g./litre of an anionic condensation product of aromatic sulphonic acids or 1–2 g./litre of non-ionic polyglycol ether derivatives. A dispersed dyestuff prepared according to the above example is then added and the pre-cleaned polyamide material is introduced. The temperature of the bath is raised to boiling point in the course of 40–60 minutes and the same temperature is maintained for about 60 minutes. The material is subsequently rinsed and dried. A clear yellow dyeing of very good fastness to light, sublimation and wet processing is obtained.

I claim:

1. Azo dyestuffs of the formula

[Structure: (X)$_n$—A—CH=CH—CO—HN—B—(Y)$_n$—N=N—C(Z)—R with OH on C ring]

in which

R represents $C_{1-4}$ alkyl; hydroxy $C_{1-4}$ alkyl; methoxy $C_{1-4}$ alkyl; ethoxy $C_{1-4}$ alkyl; phenyl; phenyl with one or more substituents selected from the group consisting of Cl, Br, $C_{1-4}$ alkyl, $C_{1-4}$ alkoxy; methylsulfonyl; or phenylsulfonyl; X, Y and Z independently represent a member of the class consisting of Cl, F, Br, $NO_2$, CN, $CONH_2$, $CONHCH_3$, $C_{1-4}$ alkyl, $C_{1-4}$ alkoxycarbonyl, $C_{1-4}$ alkoxy, hydroxy $C_{1-4}$ alkoxy, $C_{1-4}$ alkylsulfonyl and $C_{1-4}$ alkylcarbonylamino, and $n$ is 0 to 2.

2. Azo dyestuffs of the formula

[Structure: (X)$_n$—phenyl—CH=CH—CO—NH—phenyl(Y)—N=N—ring(Z) with OH and R″]

in which

R″ means $C_1$–$C_4$-alkyl which is unsubstituted or substituted by hydroxyl or methoxy groups, or means unsubstituted phenyl;

X stands for chlorine, bromine, nitro, cyano, methyl, methoxy, methylsulphonyl, acetylamino or methoxycarbonyl;

Y and Z mean chlorine, methyl, methoxy or nitro; and $n$ represents a number from 0 to 2.

3. Azo dyestuff of the formula

[Structure: phenyl—CH=CH—CO—HN—phenyl—N=N—phenyl(OH)(CH$_3$)]

4. Azo duestuff of the formula

[Structure: Cl—phenyl—CH=CH—CO—HN—phenyl—N=N—phenyl(OH)(CH$_3$)]

5. Azo dyestuff of the formula

[Structure: H$_3$C—phenyl—CH=CH—CO—HN—phenyl—N=N—phenyl(OH)(CH$_3$)]

6. Azo dyestuff of the formula

[Structure: phenyl—CH=CH—CO—HN—phenyl(Cl)(Cl)—N=N—phenyl(OH)(CH$_3$)]

7. Azo dyestuff of the formula

[Structure: phenyl—CH=CH—CO—HN—phenyl—N=N—phenyl(OH)(C(CH$_3$)$_3$)]

References Cited

UNITED STATES PATENTS 3,158,595  11/1964  Green et al. _____ 260—207.1 X
3,208,992  9/1965   Bowman et al. _____ 260—207 X

FOREIGN PATENTS

4/19,982  11/1966  Japan _____ 260—206

LEWIS GOTTS, Primary Examiner
C. F. WARREN, Assistant Examiner

U.S. Cl. X.R.

8—41 B, 41 C; 260—206, 207.1